US012651777B2

(12) United States Patent
Yoshioka

(10) Patent No.: US 12,651,777 B2
(45) Date of Patent: Jun. 9, 2026

(54) SOLID-STATE BATTERY AND SOLID-STATE BATTERY GROUP

(71) Applicant: Murata Manufacturing Co., Ltd., Nagaokakyo (JP)

(72) Inventor: Makoto Yoshioka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 841 days.

(21) Appl. No.: 17/198,381

(22) Filed: Mar. 11, 2021

(65) Prior Publication Data

US 2021/0203007 A1 Jul. 1, 2021

Related U.S. Application Data

(63) Continuation of application No. PCT/JP2019/034792, filed on Sep. 4, 2019.

(30) Foreign Application Priority Data

Sep. 14, 2018 (JP) ................................. 2018-172803

(51) Int. Cl.
*H01M 10/052* (2010.01)
*H01M 10/0525* (2010.01)
(Continued)

(52) U.S. Cl.
CPC ... *H01M 10/0585* (2013.01); *H01M 10/0525* (2013.01); *H01M 50/10* (2021.01);
(Continued)

(58) Field of Classification Search
CPC ......... H01M 10/0585; H01M 10/0525; H01M 50/10; H01M 50/103; H01M 50/117;
(Continued)

(56) References Cited

U.S. PATENT DOCUMENTS

| | | | |
|---|---|---|---|
| 8,778,542 B2 | 7/2014 | Iwaya et al. | |
| 2003/0152829 A1* | 8/2003 | Zhang .................. | H01M 50/119 429/185 |

(Continued)

FOREIGN PATENT DOCUMENTS

| | | |
|---|---|---|
| JP | 2006351326 A | 12/2006 |
| JP | 2007005279 A | 1/2007 |

(Continued)

OTHER PUBLICATIONS

Written Opinion of the International Search Authority issued for PCT/JP2019/034792, date of mailing Nov. 19, 2019.
(Continued)

*Primary Examiner* — Christian Roldan
(74) *Attorney, Agent, or Firm* — ArentFox Schiff LLP

(57) ABSTRACT

A solid-state battery including a battery element having one or more battery constitutional units, each battery constitutional unit including a positive electrode layer and a negative electrode layer facing each other and a solid electrolyte layer arranged between the positive electrode layer and the negative electrode layer; and a protective layer covering a surface of the battery element, the protective layer including an insulating substance other than resin.

17 Claims, 11 Drawing Sheets

(51) Int. Cl.

| | |
|---|---|
| *H01M 10/0585* | (2010.01) |
| *H01M 50/10* | (2021.01) |
| *H01M 50/103* | (2021.01) |
| *H01M 50/117* | (2021.01) |
| *H01M 50/172* | (2021.01) |

(52) U.S. Cl.
CPC ....... *H01M 50/103* (2021.01); *H01M 50/117* (2021.01); *H01M 50/172* (2021.01)

(58) Field of Classification Search
CPC ............. H01M 50/172; H01M 10/052; H01M 50/141; H01M 10/0562; H01M 8/0273; Y02P 70/50; Y02E 60/10
USPC .......................................................... 429/162
See application file for complete search history.

(56) References Cited

U.S. PATENT DOCUMENTS

| | | | | |
|---|---|---|---|---|
| 2005/0141170 | A1* | 6/2005 | Honda ................... | C23C 14/042 |
| | | | | 429/162 |
| 2012/0015234 | A1 | 1/2012 | Iwaya et al. | |

| | | | | |
|---|---|---|---|---|
| 2014/0376160 | A1* | 12/2014 | Kako ................... | H01M 50/446 |
| | | | | 429/144 |
| 2015/0280277 | A1* | 10/2015 | Fleischmann ......... | H01M 4/382 |
| | | | | 429/126 |
| 2019/0019843 | A1* | 1/2019 | Fujinuma ............... | H10K 39/00 |
| 2019/0252728 | A1 | 8/2019 | Shimizu et al. | |

FOREIGN PATENT DOCUMENTS

| | | | | |
|---|---|---|---|---|
| JP | 2008186595 | A | | 8/2008 |
| JP | 2008226728 | A | | 9/2008 |
| JP | 4352016 | B2 | * | 10/2009 |
| JP | 2010140725 | A | | 6/2010 |
| JP | 2013016286 | A | | 1/2013 |
| JP | 2016001601 | A | | 1/2016 |
| WO | 2014050500 | A1 | | 4/2014 |
| WO | 2018087970 | A1 | | 5/2018 |
| WO | 2018163514 | A1 | | 9/2018 |

OTHER PUBLICATIONS

International Search Report issued for PCT/JP2019/034792, date of mailing Nov. 19, 2019.

* cited by examiner

200A

200B

500H

SOLID-STATE BATTERY AND SOLID-STATE BATTERY GROUP

CROSS REFERENCE TO RELATED APPLICATIONS

The present application is a continuation of International application No. PCT/JP2019/034792, filed Sep. 4, 2019, which claims priority to Japanese Patent Application No. 2018-172803, filed Sep. 14, 2018, the entire contents of each of which are incorporated herein by reference.

FIELD OF THE INVENTION

The present invention relates to a solid-state battery and a solid-state battery group.

BACKGROUND OF THE INVENTION

In recent years, demand for batteries as power sources for portable electronic devices such as mobile phones and portable personal computers has increased significantly. In batteries used for such purposes, an electrolyte (electrolytic solution) such as an organic solvent has been conventionally used as a medium for moving ions. However, in the battery having the above configuration, there is a risk that the electrolytic solution may leak out. Furthermore, the organic solvent and the like used in the electrolytic solution are flammable substances. Thus, it is required to improve safety for the battery.

Accordingly, in order to improve safety for the battery, research on a solid-state battery using a solid electrolyte as the electrolyte instead of the electrolytic solution is in progress.

For example, Patent Documents 1 to 3 disclose a technique to form a protective layer containing a polymer compound on the outermost surface of a battery element having a positive electrode and a negative electrode and a solid electrolyte between them, so as to electrically and physically protect the solid-state battery.

Patent Document 1: Japanese Patent Application Laid-Open No. 2008-186595

Patent Document 2: Japanese Patent Application Laid-Open No. 2006-351326

Patent Document 3: Japanese Patent Application Laid-Open No. 2016-001601

SUMMARY OF THE INVENTION

However, the inventors of the present invention have found that when the solid-state battery has the protective layer containing the polymer compound on the surface of the battery element, the protective layer expands and cracks and/or falls off due to the polymer compound adsorbing water or gas, and thus the function as the protective layer is lost and battery performance deteriorates.

The inventors of the present invention have also found that when the surface of the battery element in the solid-state battery is just covered with the protective film containing a polymer compound, the protective layer is likely to fall off due to strong vibration, impact, and the like on the battery, and thus the function as the protective layer will be lost and the battery performance will deteriorate.

It is an object of the present invention to provide a solid-state battery having a protective layer that is less likely to adsorb water and gas and has high joint strength with a battery element as compared to a protective layer containing a polymer compound.

More specifically, it is an object of the present invention to provide a solid-state battery having a protective layer that is less likely to crack and fall off due to adsorption of water and gas, and is less likely to fall off due to vibration and impact as compared to a protective layer containing a polymer compound.

The solid state battery according to an aspect of the present invention includes a battery element having one or more battery constitutional units, each battery constitutional unit including a positive electrode layer and a negative electrode layer facing each other and a solid electrolyte layer arranged between the positive electrode layer and the negative electrode layer; and a protective layer covering a surface of the battery element, the protective layer including an insulating substance other than resin.

A solid-state battery according to the present invention has a protective layer that is less likely to adsorb water and gas and has high joint strength with a battery element as compared to a protective layer containing a polymer compound. Consequently, in the solid-state battery according to the present invention, the protective layer is less likely to crack and fall off due to adsorption of water and gas, and is less likely to fall off due to vibration, impact, and the like as compared to the protective layer containing a polymer compound. Therefore, the solid-state battery according to the present invention can further suppress deterioration of battery performance.

DETAILED DESCRIPTION OF THE INVENTION

[Solid-State Battery]

Figure 1A:
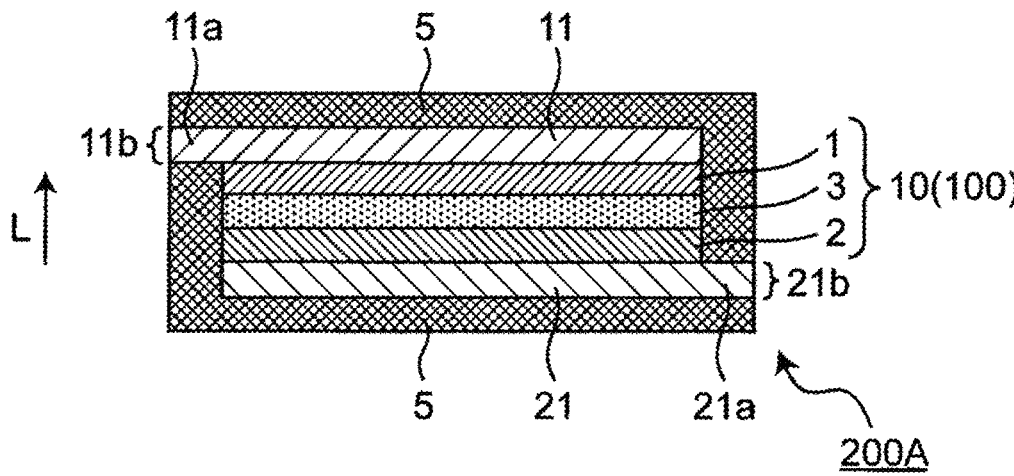
FIG. 1A is a schematic sectional view illustrating an example of a solid-state battery according to the present invention having a single battery structure in a battery element.

The present invention provides a solid-state battery. The term "solid-state battery" as used herein refers in a broad sense to a battery in which its components (particularly an electrolyte layer) are constituted of solids, and refers in a narrow sense to an "all-solid-state battery" in which its components (particularly all the components) are constituted of solids. In one preferred embodiment, the solid-state battery according to the present invention is a stacked solid-state battery in which the respective layers forming the battery constitutional unit are stacked on each other, and preferably each of such layers is made of a sintered body. The "solid-state battery" as used herein includes what is called a "secondary battery" capable of repeating charging and discharging, and a "primary battery" capable of discharging only. In one preferred embodiment of the present invention, the "solid-state battery" is a "secondary battery". The "secondary battery" is not overly limited by its name and may include, for example, a "storage device". The term "solid electrolyte" as used herein refers to one that does not contain a gel-like or liquid electrolyte (liquid).

The term "plan view" as used herein refers to a state (top view or bottom view) in which an object is viewed from above or below along a thickness direction based on a stacking direction L of layers to be described later that constitute the solid-state battery. Further, the "sectional view" as used herein refers to a sectional state (sectional view) when viewed from a direction substantially perpendicular to the thickness direction based on the stacking direction L of the layers to be described later that constitute the solid-state battery. The "side view" is a state when the solid-state battery is mounted and viewed from the side of a thickness (height) direction thereof, and means the same as lateral view. The mounting is a mounting with a surface (planar surface) of the maximum area constituting the appearance of the solid-state battery being a bottom surface. The "vertical direction" and "horizontal direction" as used directly or indirectly herein correspond to a vertical direction and a horizontal direction in the drawings, respectively. Unless otherwise specified, the same reference sign or symbol indicates the same member or part or the same meaning and content. In one preferred embodiment, it can be considered that a vertical downward direction (that is, the direction in which gravity acts) corresponds to a "downward direction" and the opposite direction corresponds to an "upward direction".

Figure 1B:
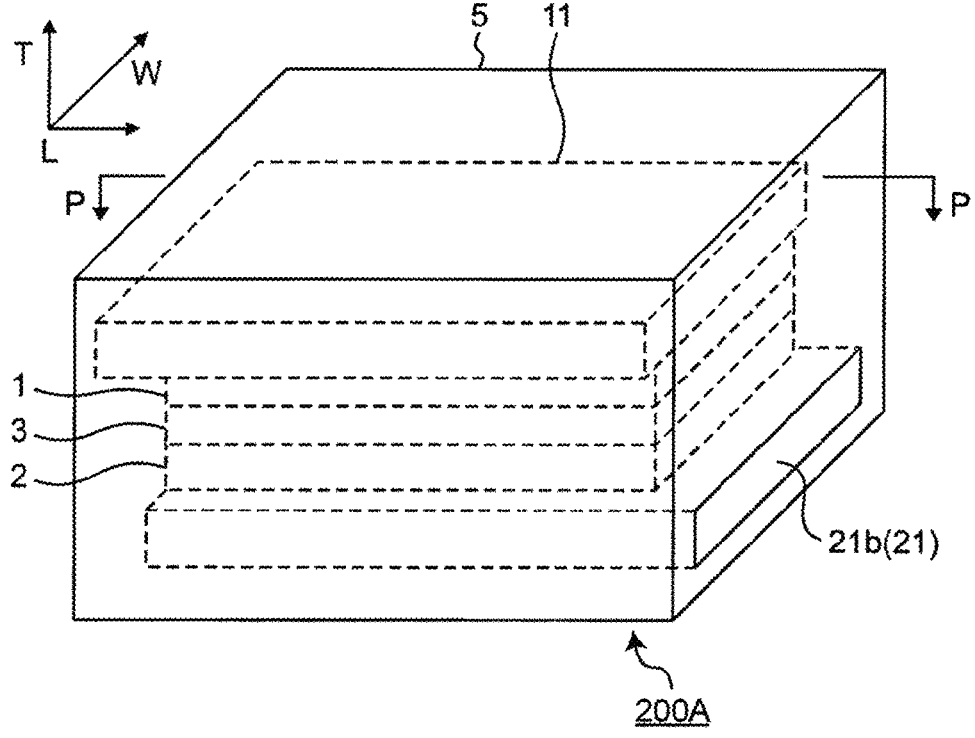
FIG. 1B is a schematic external perspective view of the solid-state battery of FIG. 1A.
Figure 1C:
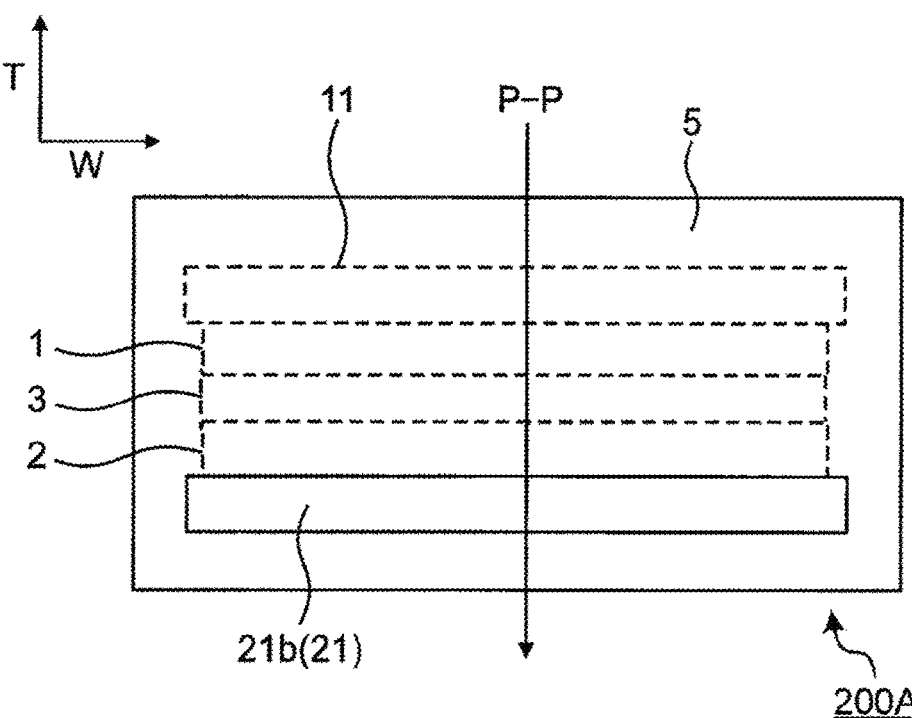
FIG. 1C is a schematic external side view of the solid-state battery of FIG. 1A.
Figure 2:
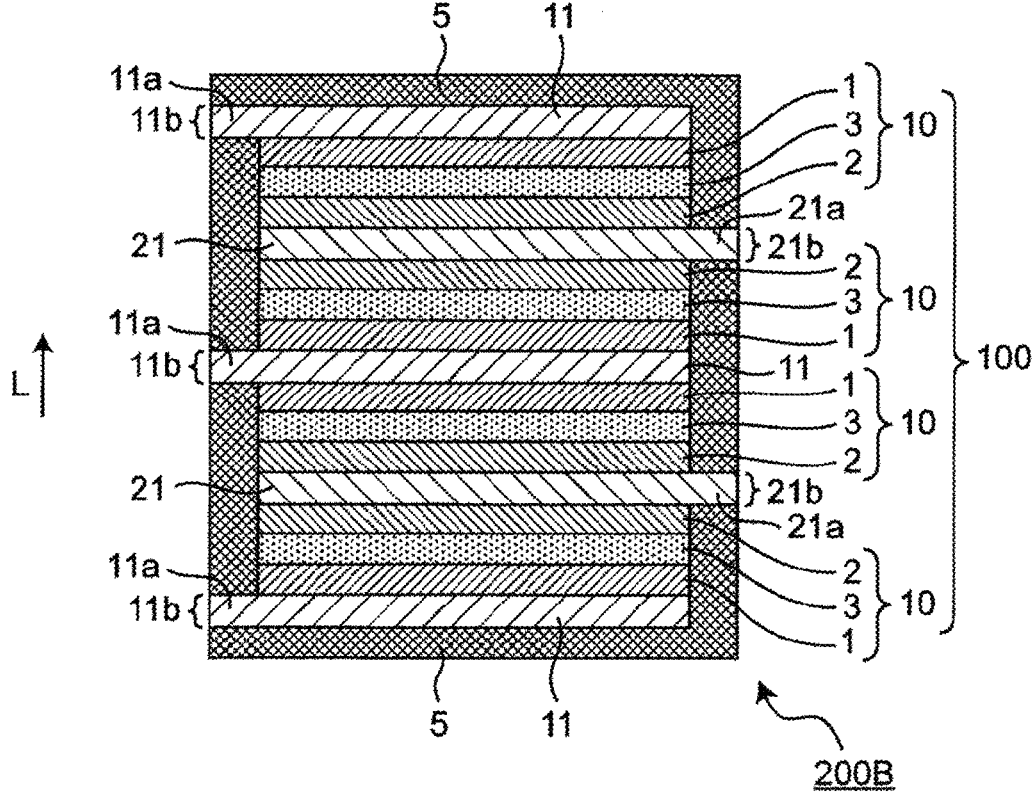
FIG. 2 is a schematic sectional view illustrating an example of the solid-state battery according to the present invention having a multiple battery structure in the battery element.
Figure 3:
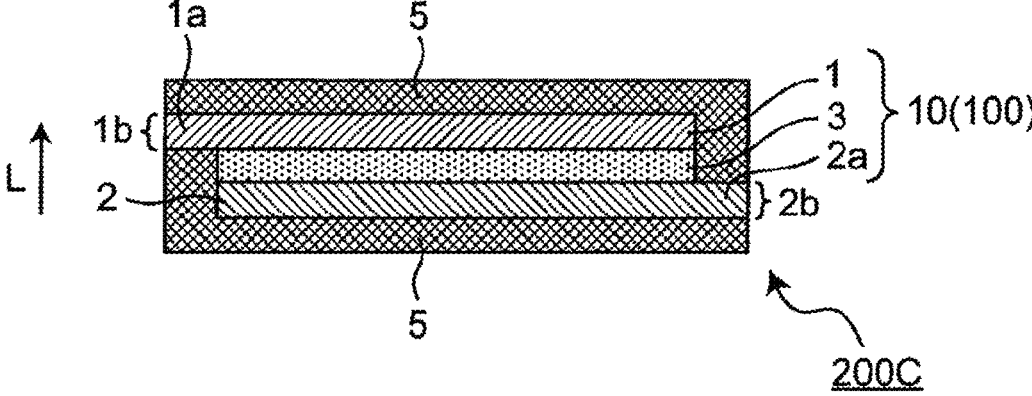
FIG. 3 is a schematic sectional view illustrating another example of the solid-state battery according to the present invention having a single battery structure in the battery element.
Figure 4:
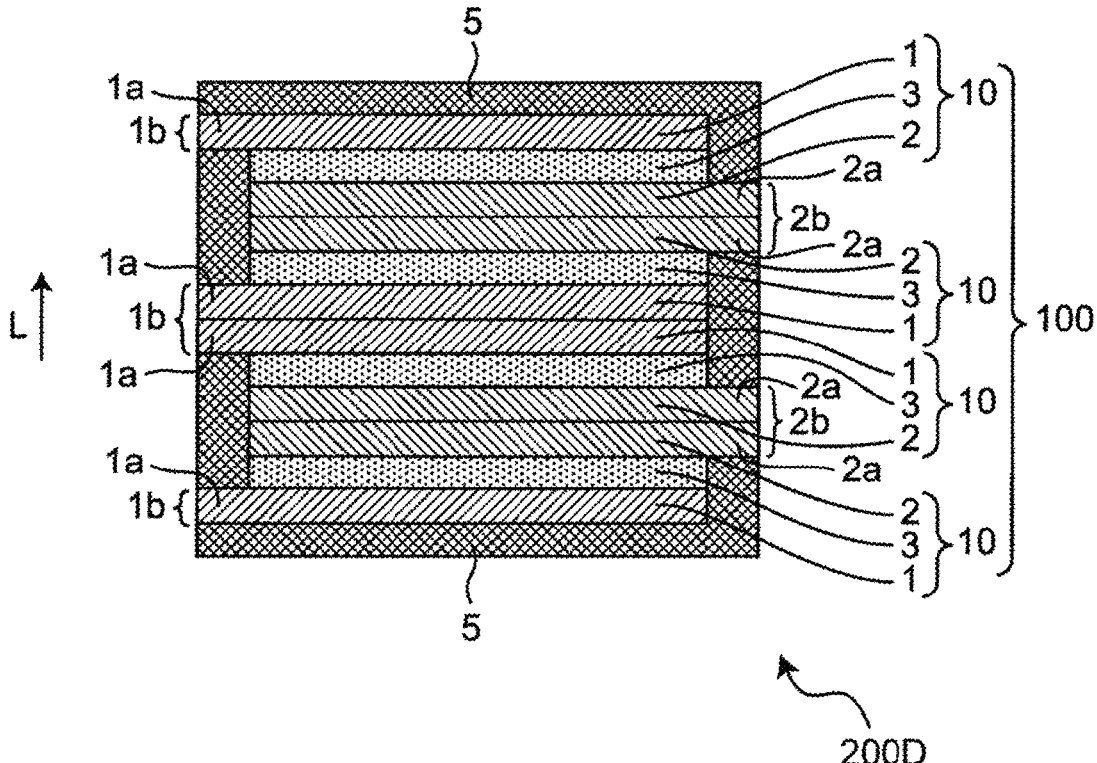
FIG. 4 is a schematic sectional view illustrating another example of the solid-state battery according to the present invention having the multiple battery structure in the battery element.

The solid-state battery according to the present invention has, for example, a layered structure (particularly a stacked structure) as denoted by reference numerals "200A", "200B", "200C", and "200D" in FIGS. 1A, 2, 3, and 4, respectively. The solid-state batteries 200A, 200B, 200C, and 200D according to the present invention include a battery element 100 and a protective layer 5 that covers a surface of the battery element 100. FIG. 1A is a schematic sectional view illustrating an example of the solid-state battery according to the present invention having a single battery structure in the battery element 100. A schematic external perspective view of the solid-state battery of FIG. 1A is illustrated in FIG. 1B. A schematic external side view (right side view) of the solid-state battery of FIG. 1A is illustrated in FIG. 1C. FIG. 1A is a sectional view of the solid-state batteries of FIGS. 1B and 1C when they are cut in a P-P section. FIG. 2 is a schematic sectional view illustrating an example of the solid-state battery according to the present invention having a multiple battery structure in the battery element 100. FIG. 3 is a schematic sectional view illustrating another example of the solid-state battery according to the present invention having the single battery structure in the battery element 100. The solid-state battery of FIG. 3 has a structure similar to that of the solid-state battery of FIG. 1A except that a positive electrode layer 1 does not have a positive electrode current collecting layer 11 and has an electrical connection portion 1a, and a negative electrode layer 2 does not have a negative electrode current collecting layer 21 and has an electrical connection portion 2a. FIG. 4 is a schematic sectional view illustrating another example of the solid-state battery according to the present invention having the multiple battery structure in the battery element 100. The solid-state battery of FIG. 4 has a structure similar to that of the solid-state battery of FIG. 2 except that the positive electrode layer 1 does not have the positive electrode current collecting layer 11 and has the electrical connection portion 1a, and the negative electrode layer 2 does not have the negative electrode current collecting layer 21 and has the electrical connection portion 2a.

The battery element 100 is a main body part of the solid-state battery covered with the protective layer 5, and includes one or more battery constitutional units 10. The battery constitutional unit 10 means a smallest constitutional unit capable of performing a battery function, and includes one positive electrode layer 1 and one negative electrode layer 2 facing each other, and one solid electrolyte layer 3 arranged between the positive electrode layer 1 and the negative electrode layer 2.

The battery element 100 may have a single battery structure having only one battery constitutional unit 10, as illustrated in FIGS. 1A and 3, for example. Further, for example, as illustrated in FIGS. 2 and 4, the battery element 100 may have a multiple battery structure having two or more battery constitutional units 10 stacked along the stacking direction L of each layer constituting each battery constitutional unit 10.

From the viewpoint of suppressing deterioration of the battery in a longer period of time, it is preferable that all the layers constituting the battery element 100 be integrally sintered as sintered bodies together between two adjacent layers. The part that all the layers are integrally sintered as sintered bodies together between two adjacent layers means that the two adjacent layers are joined by sintering. Specifically, the two adjacent layers are both sintered bodies, but are integrally sintered. Note that the two adjacent layers do not have to be all strictly integrated, and a part of the layers may be not integrated. The two adjacent layers are only required to be integrated as a whole.

For example, as illustrated in FIGS. 1A and 2, when the battery element 100 has one or more battery constitutional units 10 and the positive electrode layer 1 and the negative electrode layer 2 have the positive electrode current collecting layer 11 and the negative electrode current collecting layer 21, respectively, it is preferable that the positive electrode current collecting layer 11, the positive electrode layer 1, the solid electrolyte layer 3, the negative electrode layer 2, and the negative electrode current collecting layer 21 employ an integrally sintered structure in a predetermined stacking order.

Further, for example, as illustrated in FIGS. 3 and 4, when the battery element 100 has one or more battery constitutional units 10, and the positive electrode layer 1 and the negative electrode layer 2 do not have the positive electrode current collecting layer 11 and the negative electrode current collecting layer 21, respectively, it is preferable that the positive electrode layer 1, the solid electrolyte layer 3, and the negative electrode layer 2 employ an integrally sintered structure in a predetermined stacking order.

The positive electrode layer 1 and the negative electrode layer 2 may have the positive electrode current collecting layer 11 and the negative electrode current collecting layer 21, respectively, as illustrated in FIGS. 1A and 2, or the positive electrode layer 1 and the negative electrode layer 2 do not need to have the positive electrode current collecting layer 11 and the negative electrode current collecting layer 21, respectively, as illustrated in FIGS. 3 and 4.

When the positive electrode layer 1 and the negative electrode layer 2 have the positive electrode current collecting layer 11 and the negative electrode current collecting layer 21, respectively, as illustrated in FIGS. 1A and 2, the positive electrode current collecting layer 11 and the negative electrode current collecting layer 21 are provided with electrical connection portions 11a and 21a, respectively, for electrical connection to the outside. The electrical connection portions 11a and 21a will be also referred to as electronic input and output portions for inputting and outputting electrons.

When the positive electrode layer 1 and the negative electrode layer 2 do not have the positive electrode current collecting layer 11 and the negative electrode current collecting layer 21, respectively, as illustrated in FIGS. 3 and 4, the positive electrode layer 1 and the negative electrode layer 2 are provided with electrical connection portions 1a and 2a, respectively, for electrical connection to the outside. The electrical connection portions 1a and 2a will be also referred to as an electron input and output portion for inputting and outputting electrons.

The solid-state batteries illustrated in FIGS. 2 and 4 include four battery constitutional units 10 in the battery element 100, but the number of battery constitutional units 10 included in one solid-state battery is not particularly limited, and for example, the number may be one or more and 100 or less, particularly one or more and 50 or less. When the battery element 100 of a solid-state battery includes two or more battery constitutional units 10, their connections are usually based on a parallel structure, but may be based on a series structure, as illustrated in FIGS. 2 and 4.

The solid-state battery according to the present invention may have any shape in a plan view, and usually has a rectangular shape. The rectangular shape includes squares and rectangles.

(Positive Electrode Layer and Negative Electrode Layer)

The positive electrode layer 1 is what is called a positive electrode active material layer, and may additionally have a positive electrode current collecting layer 11. When the positive electrode layer 1 has the positive electrode current collecting layer 11, the positive electrode layer 1 may be provided on one side of the positive electrode current collecting layer 11 or may be provided on both sides. The positive electrode layer 1 is constituted of a sintered body containing positive electrode active material particles, and may usually be constituted of a sintered body containing positive electrode active material particles, electron conductive material particles, and solid electrolyte particles contained in the solid electrolyte layer 3.

The negative electrode layer 2 is what is called a negative electrode active material layer, and may additionally have a negative electrode current collecting layer 12. When the negative electrode layer 2 has the negative electrode current collecting layer 21, the negative electrode layer 1 may be provided on one side of the negative electrode current collecting layer 21 or may be provided on both sides. The negative electrode layer 2 is constituted of a sintered body containing negative electrode active material particles, and may usually be constituted of a sintered body containing negative electrode active material particles, the electron conductive material particles, and the solid electrolyte particles contained in the solid electrolyte layer 3.

The positive electrode active material contained in the positive electrode layer and the negative electrode active material contained in the negative electrode layer are substances involved in exchange of electrons in the solid-state battery, and ions contained in a solid electrolyte material constituting the solid electrolyte layer move (being conducted) between the positive electrode and the negative electrode and exchange electrons, thereby performing charging and discharging. The positive electrode layer and the negative electrode layer are particularly preferably layers capable of occluding and releasing lithium ions. That is, the solid-state battery according to the present invention is preferably a solid-state secondary battery in which lithium ions move between the positive electrode and the negative electrode through the solid electrolyte layer to charge and discharge the battery.

The positive electrode active material contained in the positive electrode layer is not particularly limited, and for example, at least one selected from the group consisting of a lithium-containing phosphoric acid compound having a NASICON-type structure, a lithium-containing phosphoric acid compound having an olivine-type structure, a lithium-containing layered oxide, and a lithium-containing oxide having a spinel-type structure, and the like may be mentioned. An example of the lithium-containing phosphoric acid compound having a NASICON-type structure is $Li_3V_2(PO_4)_3$ or the like. Examples of the lithium-containing phosphoric acid compound having an olivine-type structure include $Li_3Fe_2(PO_4)_3$, $LiMnPO_4$, and the like. Examples of the lithium-containing layered oxide include $LiCoO_2$, $LiCo_{1/3}Ni_{1/3}Mn_{1/3}O_2$, and the like. Examples of the lithium-containing oxide having a spinel-type structure include $LiMn_2O_4$, $LiNi_{0.5}Mn_{1.5}O_4$, and the like.

The negative electrode active material contained in the negative electrode layer is not particularly limited, and for example, at least one selected from the group consisting of an oxide containing at least one element selected from the group consisting of Ti, Si, Sn, Cr, Fe, Nb, and Mo, a graphite-lithium compound, a lithium alloy, a lithium-containing phosphoric acid compound having a NASICON-type structure, a lithium-containing phosphoric acid compound having an olivine-type structure, and a lithium-containing oxide having a spinel-type structure and the like may be mentioned. An example of the lithium alloy is Li—Al and the like. An example of the lithium-containing phosphoric acid compound having a NASICON-type structure is $Li_3V_2(PO_4)_3$ or the like. An example of the lithium-containing phosphoric acid compound having an olivine-type structure is $Li_3Fe_2(PO_4)_3$, and the like. An example of the lithium-containing oxide having a spinel-type structure is $Li_4Ti_5O_{12}$, and the like.

The electron conductive material contained in the positive electrode layer and the negative electrode layer is not particularly limited, and examples thereof include metal materials such as silver, palladium, gold, platinum, aluminum, copper, and nickel, and carbon materials. In particular, carbon is preferable because it does not easily react with the positive electrode active material, the negative electrode active material, and the solid electrolyte material, and is effective in reducing internal resistance of the solid-state battery.

The solid electrolyte material contained in the positive electrode layer and the negative electrode layer may be selected from, for example, materials similar to solid electrolyte materials that can be contained in the solid electrolyte layer that will be described later.

The positive electrode layer and the negative electrode layer may each independently contain a sintering additive. The sintering additive is not particularly limited and can be, for example, at least one selected from the group consisting of lithium oxide, sodium oxide, potassium oxide, boron oxide, silicon oxide, bismuth oxide, and phosphorus oxide.

When the positive electrode layer 1 and the negative electrode layer 2 do not have the positive electrode current collecting layer 11 and the negative electrode current collecting layer 21, which will be described later, respectively, as illustrated in FIGS. 3 and 4, the positive electrode layer 1 and the negative electrode layer 2 have electrical connection portions 1a and 2a, respectively, for electrical connection to the outside and are configured to be electrically connectable to terminals. The electrical connection portions 1a and 2a have exposed portions 1b and 2b that are not covered with the protective layer 5, which will be described later, and are usually provided at ends of the positive electrode layer 1 and the negative electrode layer 2, respectively.

The thicknesses of the positive electrode layer and the negative electrode layer are not particularly limited, and may each be, for example, 2 μm or more and 50 μm or less, particularly 5 μm or more and 30 μm or less, independently of each other.

(Positive Electrode Current Collecting Layer and Negative Electrode Current Collecting Layer)

The positive electrode layer 1 and the negative electrode layer 2 may have the positive electrode current collecting layer 11 and the negative electrode current collecting layer 21, respectively, on opposite sides of the solid electrolyte layer 3. When the positive electrode layer 1 and the negative electrode layer 2 have the positive electrode current collecting layer 11 and the negative electrode current collecting layer 21, respectively, as illustrated in FIGS. 1A and 2, the positive electrode current collecting layer 11 and the negative electrode current collecting layer 21 have electrical connection portions 11a and 21a, respectively, for electrical connection to the outside, and are configured to be electrically connectable to terminals. The electrical connection portions 11a and 21a have exposed portions 11b and 21b that are not covered with the protective layer 5, which will be described later, and are usually provided at ends of the positive electrode current collecting layer 11 and the negative electrode current collecting layer 21, respectively.

The positive electrode current collecting layer 11 and the negative electrode current collecting layer 21 may each have a foil form, but from the viewpoint of proposing manufacturing cost of the solid-state battery by integral firing and reducing internal resistance of the solid-state battery, it is preferable to have the form of a sintered body.

When the positive electrode current collecting layer 11 and the negative electrode current collecting layer 21 have the form of a sintered body, they may be constituted of, for example, a sintered body containing electron conductive material particles and a sintering additive. The electron conductive material contained in the positive electrode current collecting layer 11 and the negative electrode current collecting layer 21 may be selected from, for example, materials similar to the electron conductive material that can be contained in the positive electrode layer and the negative electrode layer. The sintering additive contained in the positive electrode current collecting layer 11 and the negative electrode current collecting layer 21 may be selected from, for example, materials similar to the sintering additive that can be contained in the positive electrode layer and the negative electrode layer.

The thicknesses of the positive electrode current collecting layer and the negative electrode current collecting layer are not particularly limited, and may each be, for example, 1 μm or more and 5 μm or less, particularly 1 μm or more and 3 μm or less, independently of each other.

(Solid Electrolyte Layer)

The solid electrolyte layer 3 is constituted of a sintered body containing solid electrolyte particles. The material of the solid electrolyte particles (that is, the solid electrolyte material) is not particularly limited as long as it can provide ions that can move between the positive electrode layer and the negative electrode layer. Examples of the solid electrolyte material include a lithium-containing phosphoric acid compound having a NASICON structure, an oxide having a perovskite structure, an oxide having a garnet type or a garnet type similar structure, and the like. As the lithium-containing phosphoric acid compound having a NASICON structure, $Li_xM_y(PO_4)_3$ may be mentioned (where $1 \leq x \leq 2$, $1 \leq y \leq 2$, and M is at least one selected from the group consisting of Ti, Ge, Al, Ga, and Zr). An example of the lithium-containing phosphoric acid compound having a NASICON structure is $Li_{1.2}Al_{0.2}Ti_{1.8}(PO_4)_3$, or the like. An example of the oxide having a perovskite structure is $La_{0.55}Li_{0.35}TiO_3$ or the like. An example of the oxide having a garnet type or a garnet type similar structure is $Li_7La_3Zr_2O_{12}$ or the like.

The solid electrolyte layer may contain a sintering additive. The sintering additive contained in the solid electrolyte layer may be selected from, for example, materials similar to the sintering additive that can be contained in the positive electrode layer and the negative electrode layer.

The thickness of the solid electrolyte layer is not particularly limited, and may be, for example, 1 μm or more and 15 μm or less, particularly 1 μm or more and 5 μm or less.

(Protective Layer)

The protective layer 5 is formed on an outer surface of the battery element 100 in the solid-state battery, and is for electrically, physically, and chemically protecting the battery element 100. In the present invention, the protective layer 5 includes an insulating substance other than resin. The Insulating substance means a material that does not have ionic conductivity or electronic conductivity. Therefore, the insulating substance other than resin is an insulating inorganic substance having neither ionic conductivity nor electron conductivity. The inorganic substance having no ionic conductivity means an inorganic substance having ionic conductivity of $1\times10^{-7}$ S/cm or less. From the viewpoint of suppressing deterioration of the battery in a longer period of time, the ionic conductivity is preferably $1\times10^{-12}$ S/cm or less. The ionic conductivity of the inorganic substance having no ionic conductivity is usually $1\times10^{-18}$ S/cm or more. The inorganic substance having no electron conductivity means an inorganic substance having electron conductivity of $1\times10^{-7}$/cm or less. From the viewpoint of suppressing deterioration of the battery in a longer period of time, the electron conductivity is preferably $1\times10^{-12}$ S/cm or less. The electron conductivity of an inorganic substance having no electron conductivity is usually $1\times10^{-18}$ S/cm or more.

Since the protective layer 5 includes such an insulating substance other than resin, the protective layer 5 has even more excellent moisture resistance, environmental resistance, and durability. Specifically, the protective layer 5 can be made as a protective layer that is difficult to adsorb, absorb and allow permeation of moisture and gas (carbon dioxide) and has high joint strength with a battery element compared to a protective layer containing resin (for example, a polymer compound). Consequently, in the solid-state battery according to the present invention, the protective layer 5 is less likely to crack and fall off based on expansion due to adsorption and absorption of water and gas (carbon dioxide) and is less likely to fall off due to vibration, impact, and the like as compared to the protective layer containing a polymer compound. Further, the protective layer 5 is less likely to allow permeation of moisture and gas (carbon dioxide) as compared to the protective layer containing a polymer compound. Consequently, the solid-state battery according to the present invention can further suppress deterioration of the battery performance. In the battery element, the positive electrode layer, the negative electrode layer, and the solid electrolyte layer have ionic conductivity and conduct lithium or sodium, but the battery performance tends to deteriorate due to adsorption and absorption of water and gas (carbon dioxide). The protective layer containing resin (for example, a polymer compound) easily adsorbs, absorbs, and allows permeation of moisture and gas (carbon dioxide) due to presence of the resin. If the protective layer easily adsorbs and absorbs water and gas (carbon dioxide), a crack and falling off based on expansion of the protective layer are likely to occur, and falling off due to vibration, impact, and the like is also likely to occur. If a crack and/or falling off occurs in the protective layer, the positive electrode layer, the negative electrode layer, and the solid electrolyte layer adsorb and absorb water and gas (carbon dioxide). Further, if the protective layer easily allows permeation of moisture and gas (carbon dioxide), the moisture and gas (carbon dioxide) invade the inside of the battery element, and the positive electrode layer, the negative electrode layer, and the solid electrolyte layer adsorb and absorb moisture and gas (carbon dioxide). Consequently, the battery performance deteriorates.

Examples of the insulating substance other than the resin constituting the protective layer 5 include glass and ceramics. Examples of the glass include quartz glass ($SiO_2$), and composite oxide-based glass that is a combination of $SiO_2$ and one selected from at least one of PbO, $B_2O_3$, MgO, ZnO, $Bi_2O_3$, $Na_2O$, and $Al_2O_3$. Examples of ceramics include alumina, cordierite, mullite, steatite, and forsterite. The protective layer 5 may be constituted of one or more materials selected from the group consisting of these substances. The protective layer 5 may contain a material having electron conductivity (for example, metal) as long as the battery element 100 is not short-circuited. When the protective layer 5 contains a material having electron conductivity, the content ratio of the electron conductive material may be, for example, 1% by volume or less. Because the protective layer 5 contains an electron conductive material (for example, metal), the heat generated by battery reaction can be smoothly released to the outside.

The protective layer 5 is constituted of a sintered body containing insulating substance particles other than the above-described resin. The sintered body constituting the protective layer 5 in the present invention has pores among the insulating substance particles, but also has density to an extent that allows suppressing adsorption, absorption, and permeation of moisture and gas (carbon dioxide) in its thickness direction (for example, the stacking direction L).

It is not strictly unacceptable for the protective layer 5 to contain resin such as a polymer compound, and the polymer compound used in the production and/or a thermal decomposition product thereof may remain. The content of residues of the polymer compound and the thermal decomposition product thereof, and the like in the protective layer is usually 0.1% by weight or less, particularly 0.01% by weight or less with respect to the total amount of the protective layer. Note that also in the positive electrode layer, the positive electrode current collecting layer, the negative electrode layer, the negative electrode current collecting layer, and the solid electrolyte layer, residues may remain as in the protective layer. For example, the content of residues in each layer of the positive electrode layer, the positive electrode current collecting layer, the negative electrode layer, the negative electrode current collecting layer, and the solid electrolyte layer, as a value with respect to the total amount of the layer, may be within a range similar to the range of the content of residues in the protective layer.

Porosity of the protective layer 5 may be, for example, 0.1% by volume or more and 20% by volume or less, particularly 1% by volume or more and 10% by volume or less. For the porosity, values measured by a weight porosity method, a calculated tomography method using CT scan, an immersion method, or the like are used.

Oxygen permeability of the protective layer 5 in the thickness direction may be, for example, $10^{-1}$ cc/m$^2$/day/ atmospheric pressure or less, particularly $10^{-3}$ cc/m$^2$/day/ atmospheric pressure or less.

$H_2O$ permeability in the thickness direction of the protective layer 5 may be, for example, $10^{-2}$ g/m$^2$/day or less, particularly $10^{-4}$ g/m$^2$/day or less. For the $H_2O$ permeability, values measured at 25° C. by a carrier gas method, a compression method, and a Ca corrosion method are used.

A thickness of a thickest portion of the protective layer 5 is preferably 500 μm or less, more preferably 100 μm or less, and further preferably 50 μm or less, from the viewpoint of further suppressing deterioration of the battery performance. The protective layer 5 preferably has an average thickness of 1 μm or more, more preferably 5 μm or more, from the viewpoint of further suppressing deterioration of the battery performance due to adsorption, absorption, permeation, and the like of moisture and gas (carbon dioxide).

For the thickness and average thickness of the thickest portion of the protective layer 5, the maximum thickness and the average thickness for thicknesses at any 100 points are used, respectively.

The protective layer 5 covers the surface of the battery element 100. The protective layer 5 usually covers the entire surface of the battery element 100. Specifically, the protective layer 5 covers the entire surface of the battery element 100 except the exposed portions 1*b* and 2*b*, which will be described later, that the electrical connection portions 1*a* and 2*a* may have and the exposed portions 11*b* and 21*b*, which will be described later, that the electrical connection portions 11*a* and 21*a* may have. The protective layer 5 may be in direct contact with the surface of the battery element 100 covered with the protective layer 5 as illustrated in FIGS. 1A and 2 to 4, or may be indirectly connected with another layer (for example, an inorganic layer or a metal layer) interposed therebetween. The part that the protective layer 5 is in direct contact with the surface of the battery element means that the protective layer 5 is in direct contact with the surface of the battery element without an interposition of the another layer, the resin layer, and the liquid electrolyte between the protective layer 5 and the battery element. In the present invention, the protective layer 5 is preferably in direct contact with the surface of the battery element 100 covered with the protective layer 5 for the following reasons (1) and (2): reason (1) the protective layer 5 is more difficult to fall off even when a strong vibration and/or impact is applied to the solid-state battery, and deterioration of the battery performance accompanying falling off of the protective layer is even more difficult to occur; and reason (2) the absence of other layers that do not exhibit a battery function reduces the volume of the solid-state battery and thus improves energy density of the battery.

It is preferable that the protective layer 5 be integrally sintered as sintered bodies together with the surface of the battery element 100 covered with the protective layer 5. The part that the protective layer 5 is integrally sintered as sintered bodies together with the surface of the battery element 100 covered with the protective layer 5 means that the protective layer 5 is joined by sintering to the surface of the battery element 100 covered with the protective layer 5. Specifically, the protective layer 5 and the surface of the battery element 100 covered with the protective layer 5 are both sintered bodies, but are integrally sintered. For example, the protective layer 5 and the battery element 100 preferably have an integrally sintered structure. Note that the protective layer 5 and the surface of the battery element 100 covered with the protective layer 5 do not have to be all strictly integrated, and a part thereof may be not integrated. The protective layer 5 and the surface of the battery element 100 covered with the protective layer 5 may be integrated as a whole.

The surface of the battery element 100 covered with the protective layer 5 may be at least a part of the surface of the battery element 100, and is usually at least a surface of outermost layers of the battery element 100. The outermost layers of the battery element 100 are an uppermost layer arranged at a top and a lowermost layer arranged at a bottom among the layers 100 constituting the battery element. The surfaces of the outermost layers are an upper surface of the uppermost layer and a lower surface of the lowermost layer.

As illustrated in FIGS. 1A and 2, when the positive electrode layer 1 and the negative electrode layer 2 have the positive electrode current collecting layer 11 and the negative electrode current collecting layer 21, respectively, the outermost layers covered with the protective layer 5 are usually selected from the positive electrode current collecting layer 11 and the negative electrode current collecting layer 21. In FIG. 1A, the outermost layers covered with the protective layer 5 are the positive electrode current collecting layer 11 as the uppermost layer and the negative electrode current collecting layer 21 as the lowermost layer. In FIG. 2, the outermost layers covered with the protective layer 5 are the positive electrode current collecting layer 11 as the uppermost layer and the positive electrode current collecting layer 11 as the lowermost layer.

As illustrated in FIGS. 3 and 4, when the positive electrode layer 1 and the negative electrode layer 2 do not have the positive electrode current collecting layer and the negative electrode current collecting layer, respectively, the outermost layers covered with the protective layer 5 are usually selected from the positive electrode layer 1 and the negative electrode layer 2. In FIG. 3, the outermost layers covered with the protective layer 5 are the positive electrode layer 1 as the uppermost layer and the negative electrode layer 2 as the lowermost layer. In FIG. 4, the outermost layers covered with the protective layer 5 are the positive electrode layer 1 as the uppermost layer and the positive electrode layer 1 as the lowermost layer.

From the viewpoint of further suppressing deterioration of the battery performance due to adsorption, absorption, permeation, and the like of moisture and gas (carbon dioxide), it is preferable that the protective layer 5 cover not only the surfaces of the outermost layers of the battery element 100 but also a side surface of the battery element 100, that is, a side surface of the stack constituted of the layers constituting the battery element 100.

In the present invention, at least a part of the electrical connection portions 11*a*, 21*a*, 1*a*, and 2*a* is not covered with the protective layer 5, and the electrical connection portions are provided with an exposed portion.

For example, as illustrated in FIGS. 1A and 2, when the positive electrode layer 1 and the negative electrode layer 2 have the positive electrode current collecting layer 11 and the negative electrode current collecting layer 21, respectively, at least a part of the electrical connection portions 11*a* and 21*a* of the positive electrode current collecting layer 11 and the negative electrode current collecting layer 21 is not covered with the protective layer 5, and the exposed portions 11*b* and 21*b* are provided in the electrical connection portions. The exposed portions 11*b* and 21*b* mean portions where the positive electrode current collecting layer 11 and the negative electrode current collecting layer 21 are exposed, respectively. At this time, from the viewpoint of suppressing deterioration of the battery performance for a longer period of time, it is preferable that the positive electrode layer 1, the positive electrode current collecting layer 11, the negative electrode layer 2, the negative electrode current collecting layer 21, and the solid electrolyte layer 3 constituting the battery element 100 are not exposed to the outside of the protective layer 5 except the exposed portions 11*b* and 21*b*. In other words, it is preferable that the protective layer 5 cover the entire surface of the outer surface of the battery element 100 except the exposed portions 11*b* and 21*b*. In FIGS. 1A and 2, all the exposed portions 11*b* and 21*b* are formed on the side surfaces of the battery element 100, but are not limited thereto. For example, the exposed portions 11*b* and 21*b* of the electrical connection portions 11*a* and 21*a* in the positive electrode current collecting layer 11 and the negative electrode current collecting layer 21 as the outermost layers, respectively, may be provided on the upper surface or the lower surface of the battery element 100 (or the solid-state battery). Note that one example of the solid-state battery in which the exposed portions 11*b* and 21*b* of the electrical connection portions 11*a* and 21*a* of the positive electrode current collecting layer 11 and the negative electrode current collecting layer 21, respectively, as the outermost layers are provided on an upper surface or a lower surface of the battery element 100 is an individual solid-state battery 200A″ that constitutes a solid-state battery group illustrated in FIG. 12, which will be described later.

Further, for example, as illustrated in FIGS. 3 and 4, when the positive electrode layer 1 and the negative electrode layer 2 do not have the positive electrode current collecting layer and the negative electrode current collecting layer, respectively, at least a part of the electrical connection portions 1*a* and 2*a* of the positive electrode layer 1 and the negative electrode layer 2 is not covered with the protective layer 5, and the exposed portions 1*b* and 2*b* are provided in the electrical connection portions. The exposed portions 1*b* and 2*b* mean portions where the positive electrode layer 1 and the negative electrode layer 2 are exposed, respectively. At this time, from the viewpoint of suppressing deterioration of the battery performance for a longer period of time, it is preferable that the positive electrode layer 1, the negative electrode layer 2, and the solid electrolyte layer 3 constituting the battery element 100 be not exposed to the outside of the protective layer 5 except the exposed portions 1*b* and 2*b*. In other words, it is preferable that the protective layer 5 cover the entire surface of the outer surface of the battery element 100 except the exposed portions 1*b* and 2*b*. In FIGS. 3 and 4, all the exposed portions 1*b* and 2*b* are formed on the side surfaces of the battery element 100, but are not limited thereto. For example, the exposed portions 1*b* and 2*b* of the electrical connection portions 1*a* and 2*a* in the positive electrode layer 1 and the negative electrode layer 2, respectively, as the outermost layers may be provided on the upper surface or the lower surface of the battery element 100.

[Solid-State Battery Group]

A solid-state battery group according to the present invention includes two or more solid-state batteries. It is preferable that the solid-state battery group according to the present invention include one or more solid-state batteries according to the present invention described above, and include only two or more solid-state batteries according to the present invention from the viewpoint of further suppressing deterioration of the battery performance in a longer period of time. That is, it is preferable that the solid-state battery group according to the present invention be constituted of only two or more solid-state batteries according to the present invention.

When the solid-state battery group according to the present invention is constituted of only two or more solid-state batteries according to the present invention, the two or more solid-state batteries according to the present invention may be independently selected from the group constituted of the above-described solid-state batteries according to the present invention. Specifically, in the two or more solid-state batteries according to the present invention, for example, at least one factor selected from the following group may be different from each other, or all of these factors may be the same:

a group constituted of the number of battery constitutional units 10 included in the battery element 100 of the solid-state battery, and types and dimensions of constituent materials in the positive electrode layer 1 (and the positive electrode current collecting layer 11), the negative electrode layer 2 (and the negative electrode current collecting layer 21), the solid electrolyte layer 3, and the protective layer 5.

Note that it is preferable that all the solid-state batteries constituting the solid-state battery group according to the present invention have the same (common) battery constitutional unit 10 from the viewpoint of further suppressing deterioration of the battery performance in a longer period of time on the basis of having a uniform battery reaction. The part that all the solid-state batteries have the same (common) battery constitutional unit 10 means that types and dimensions of constituent materials of the positive electrode layer 1 (and the positive electrode current collecting layer 11), the negative electrode layer 2 (and the negative electrode current collecting layer 21), and the solid electrolyte layer in the all solid-state batteries are the same.

When the solid-state battery group according to the present invention is constituted of only two or more solid-state batteries according to the present invention, each solid-state battery is separated by the adjacent solid-state battery and the protective layer. Therefore, capacities and voltages of the solid-state batteries can be freely combined. Consequently, deterioration of the battery performance can be further suppressed in a longer period of time while easily meeting specifications of the solid-state battery group (for example, capacity and voltage of the battery) demanded by the user.

By selecting two or more solid-state batteries having different numbers of battery constitutional units 10 included in the battery element 100, it is possible to easily meet the battery capacity of the solid-state battery group demanded by the user.

By selecting two or more solid-state batteries using constituent elements and/or constituent materials having different ratios thereof as the constituent materials of the protective layer, a difference in thermal expansion between the solid-state battery group and the substrate or housing for supporting or accommodating the solid-state battery group can be adjusted. Consequently, it is possible to suppress deterioration of the battery performance for a longer period of time while suppressing falling off and the like of the solid-state battery group from the substrate or housing due to the excessive difference in thermal expansion.

Such preferred embodiments of the solid-state battery group according to the present invention will be exemplified below.

Figure 5:
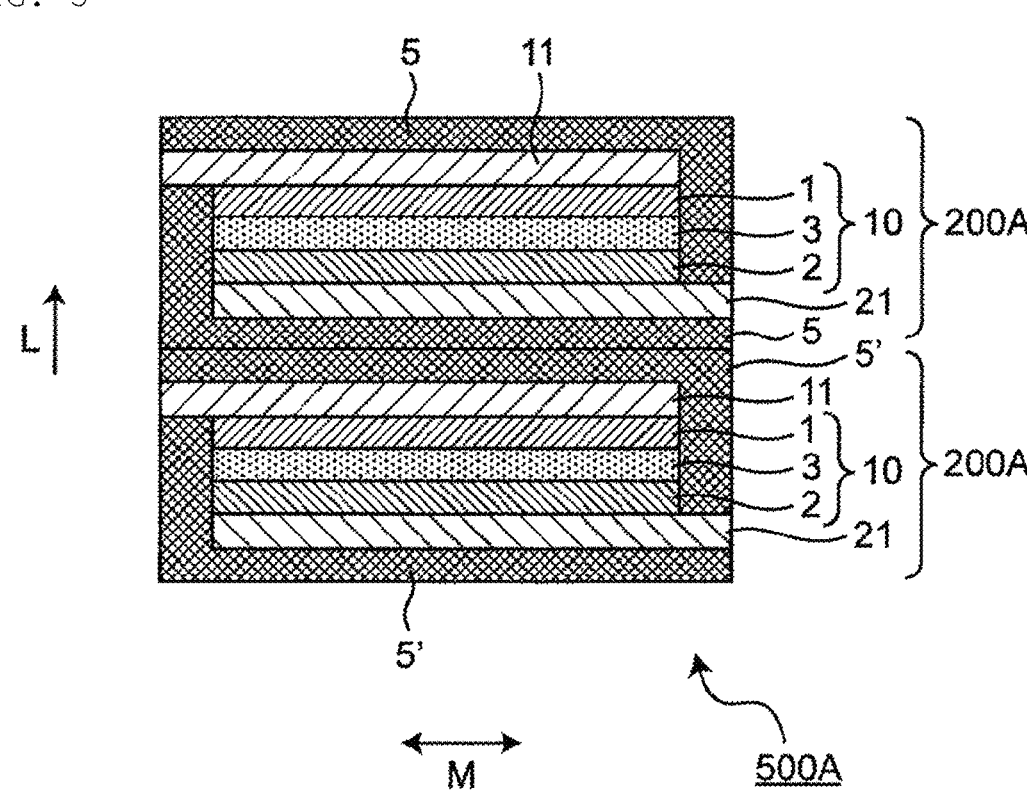
FIG. 5 illustrates a schematic sectional view of a solid-state battery group according to a first embodiment of the present invention.

For example, a solid-state battery group 500A of FIG. 5 includes only two solid-state batteries according to the present invention, an upper solid-state battery corresponds to a solid-state battery 200A of FIG. 1A, and a lower solid-state battery corresponds to a solid-state battery 200A′ having protective layers 5′ that have different constituent materials from those of the protective layer 5 of the upper solid-state battery 200A. FIG. 5 illustrates a schematic sectional view of a solid-state battery group according to a first embodiment of the present invention. Note that the protective layer 5′ indicates that constituent materials actually used are different from those of the protective layer 5, and are included in the protective layer 5 described above.

Figure 6:
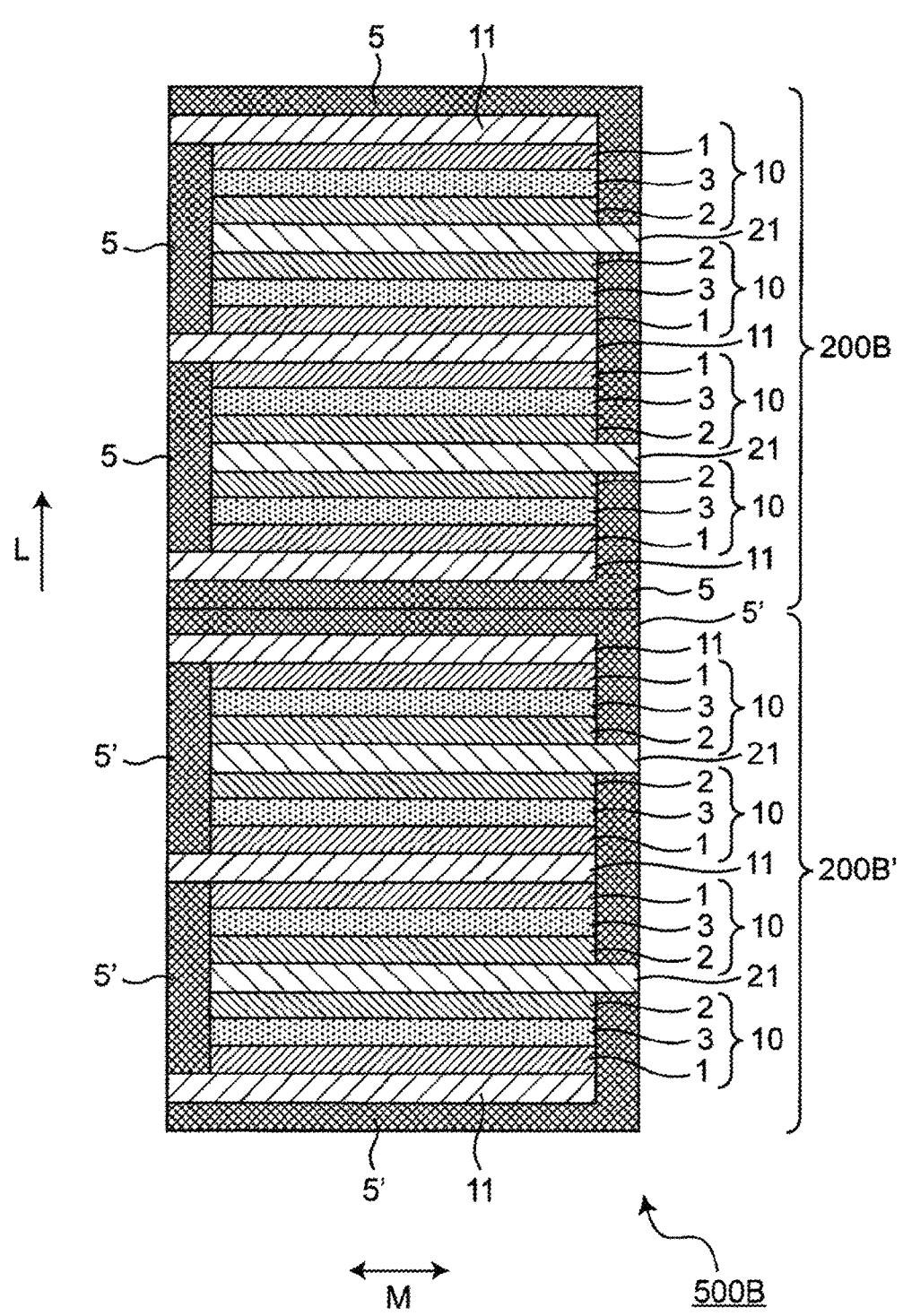
FIG. 6 illustrates a schematic sectional view of a solid-state battery group according to a second embodiment of the present invention.

Further, for example, a solid-state battery group 500B of FIG. 6 includes only two solid-state batteries according to the present invention, an upper solid-state battery corresponds to a solid-state battery 200B of FIG. 2, and a lower solid-state battery corresponds to a solid-state battery 200B′ having protective layers 5′ that have different constituent materials from those of the protective layer 5 of the upper solid-state battery 200B. FIG. 6 illustrates a schematic sectional view of a solid-state battery group according to a second embodiment of the present invention.

Figure 7:
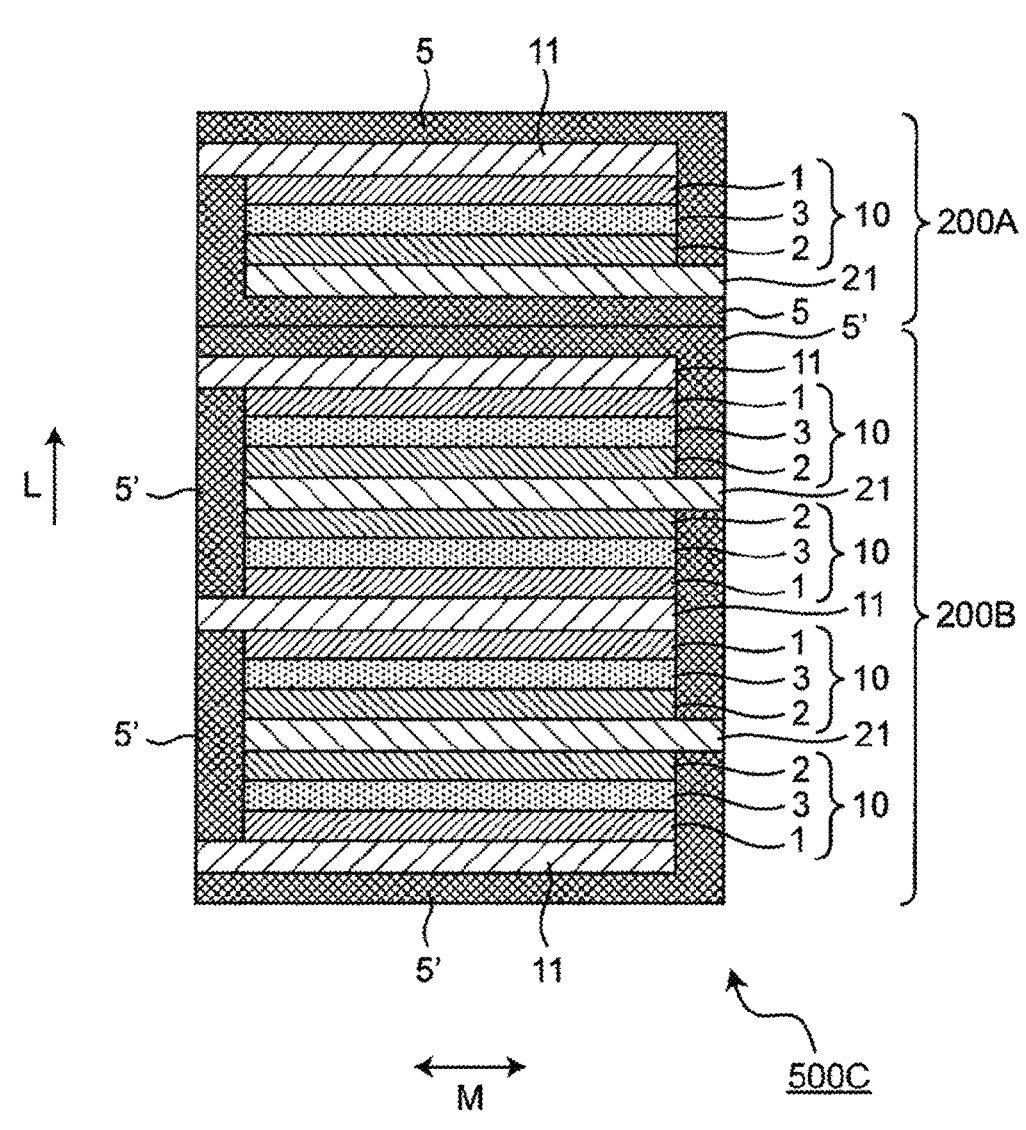
FIG. 7 illustrates a schematic sectional view of a solid-state battery group according to a third embodiment of the present invention.

Further, for example, the solid-state battery group 500C of FIG. 7 includes only two solid-state batteries according to the present invention, an upper solid-state battery corresponds to the solid-state battery 200A of FIG. 1A, a lower solid-state battery corresponds to the solid-state battery 200B of FIG. 2, and constituent materials of the protective layer 5 of the upper solid-state battery 200A and the protective layer 5′ of the lower solid-state battery 200B are different. FIG. 7 illustrates a schematic sectional view of a solid-state battery group according to a third embodiment of the present invention.

Figure 8:
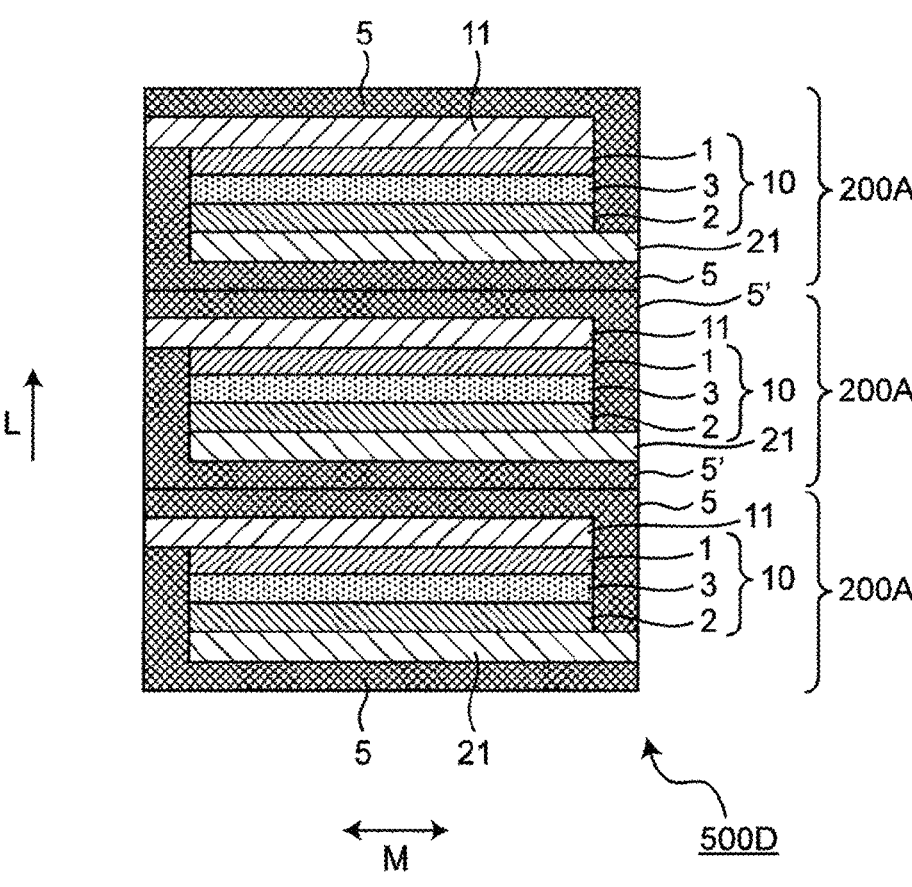
FIG. 8 illustrates a schematic sectional view of a solid-state battery group according to a fourth embodiment of the present invention.

Further, for example, a solid-state battery group 500D of FIG. 8 includes only three solid-state batteries according to the present invention, upper and lower solid-state batteries correspond to a solid-state battery 200A of FIG. 1A, and a middle solid-state battery corresponds to a solid-state battery 200A' having protective layers 5' that have different constituent materials from those of the protective layer 5 of the upper and lower solid-state batteries 200A. FIG. 8 illustrates a schematic sectional view of a solid-state battery group according to a fourth embodiment of the present invention.

The number of solid-state batteries included in the solid-state battery group according to the present invention is not particularly limited, and may be, for example, two or more, particularly two or more and 100 or less, preferably two or more and 50 or less. The connection of two or more solid-state batteries constituting the solid-state battery group is usually based on a parallel structure as illustrated in FIGS. 5 to 8, but may be based on a series structure.

In the solid-state battery group according to the present invention, it is preferable that two adjacent solid-state batteries are integrally sintered as sintered bodies together with the protective layer interposed therebetween, among the two or more (preferably all) solid-state batteries constituting the solid-state battery group. Thus, even when a strong vibration or impact is applied to the solid-state battery group, it is difficult for the solid-state batteries to separate from each other, and it is difficult for the battery performance to deteriorate due to separation. Furthermore, deterioration of the battery performance can be further suppressed as compared to a case where the protective layer is not interposed between the two adjacent solid-state batteries. Details of this mechanism are unknown, but it is conceivably based on the following mechanism. When no protective layer is interposed between two adjacent solid-state batteries, stress caused by volume expansion of the positive electrode layer and the negative electrode layer due to battery reaction (charge and discharge reaction) is easily transmitted between two adjacent solid-state batteries even if it is local. Such stress is dispersed by the interposition of the protective layer and is difficult to be transmitted between the two adjacent solid-state batteries, and thus deterioration of the battery performance can be further suppressed.

The part that two adjacent solid-state batteries are integrally sintered as sintered bodies together with the protective layer interposed therebetween means that the two adjacent solid-state batteries are joined by sintering with the protective layer interposed therebetween. Specifically, the two adjacent solid-state batteries and the protective layer therebetween are all sintered bodies, but are integrally sintered. More specifically, while the protective layer and the battery element are integrally sintered as sintered bodies together in each solid-state battery, the protective layer of one solid-state battery and the protective layer of the other solid-state battery are integrally sintered (joined) as sintered bodies together. Note that it is not always needed to strictly integrate all of between the protective layer and the battery element in each solid-state battery and between the protective layer of one solid-state battery and the protective layer of the other solid-state battery, and a part thereof may be not integrated. The protective layer and the battery element in each solid-state battery are only required to be integrated as a whole. The protective layer of one solid-state battery and the protective layer of the other solid-state battery are only required to be integrated as a whole.

In the solid-state battery group according to the present invention illustrated in FIGS. 5 to 8, all the solid-state batteries constituting the solid-state battery group are stacked along the stacking direction L of each layer constituting each battery constitutional unit. At least a part of the solid-state batteries constituting the solid-state battery group according to the present invention may be arranged in the direction M perpendicular to the stacking direction L. Integral sintering (joining) of sintered bodies together with the protective layer interposed therebetween can be achieved both between the two solid-state batteries adjacent to each other in the stacking direction L and between the two solid-state batteries adjacent to each other in the direction M perpendicular to the stacking direction L. A solid-state battery group 500H illustrated in FIG. 12, which will be described later, may be mentioned as an example of the solid-state battery group in which integral sintering (joining) of sintered bodies together with the protective layer interposed therebetween is achieved between the two solid-state batteries adjacent to each other in the stacking direction L and between the two solid-state batteries adjacent to each other in the direction M perpendicular to the stacking direction L.

Figure 9:
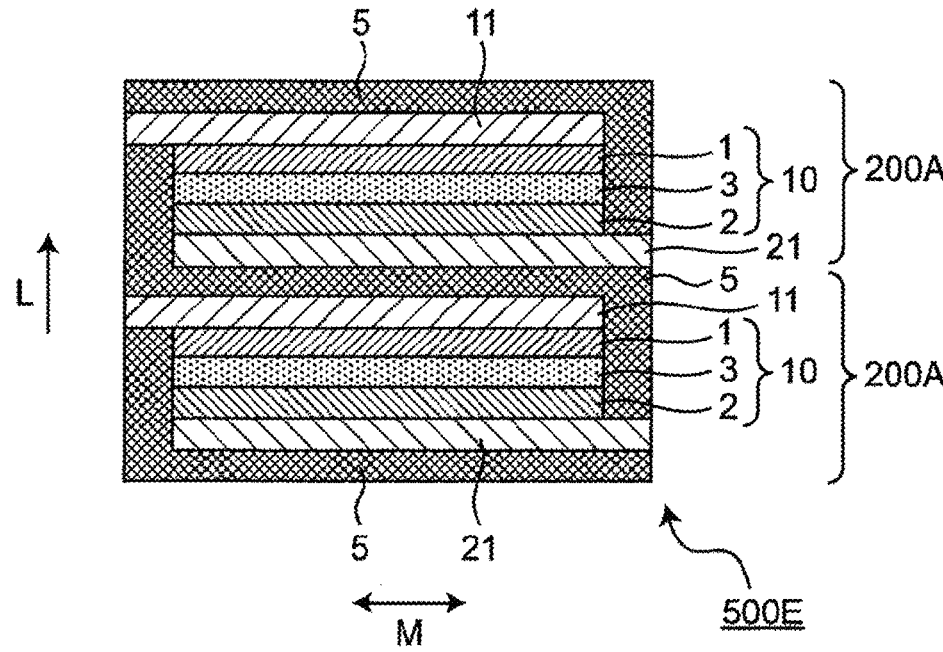
FIG. 9 illustrates a schematic sectional view of a solid-state battery group according to a fifth embodiment of the present invention.
Figure 10:
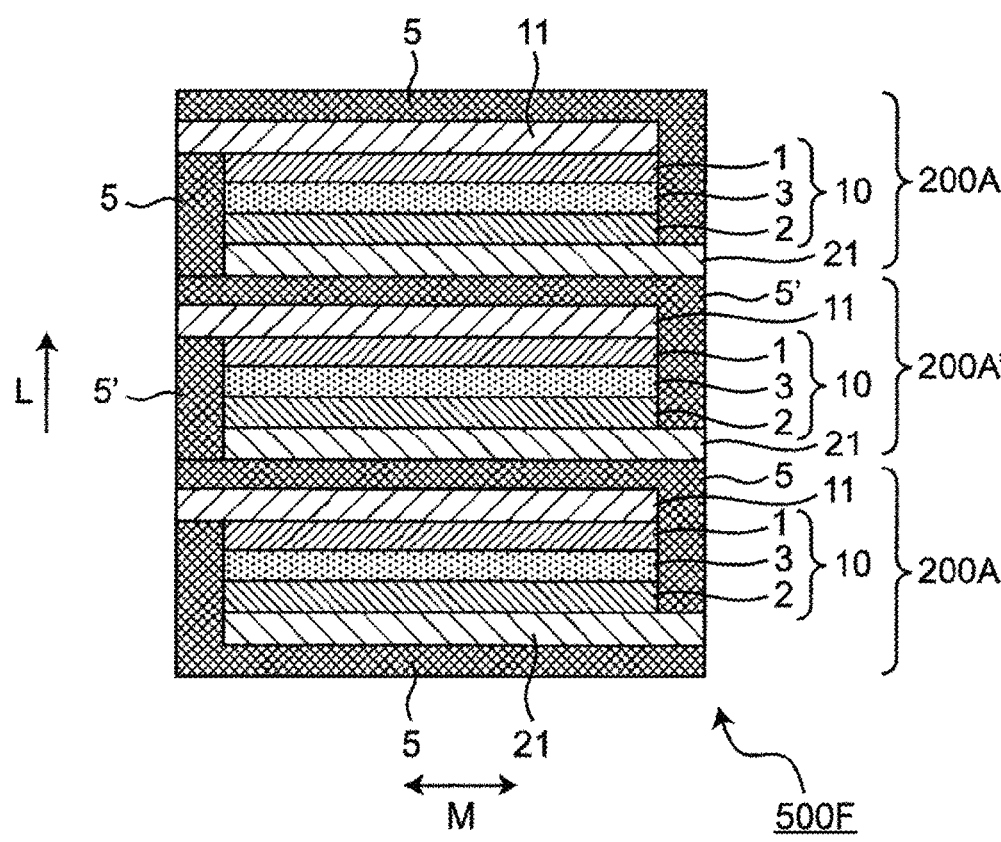
FIG. 10 illustrates a schematic sectional view of a solid-state battery group according to a sixth embodiment of the present invention.
Figure 11:
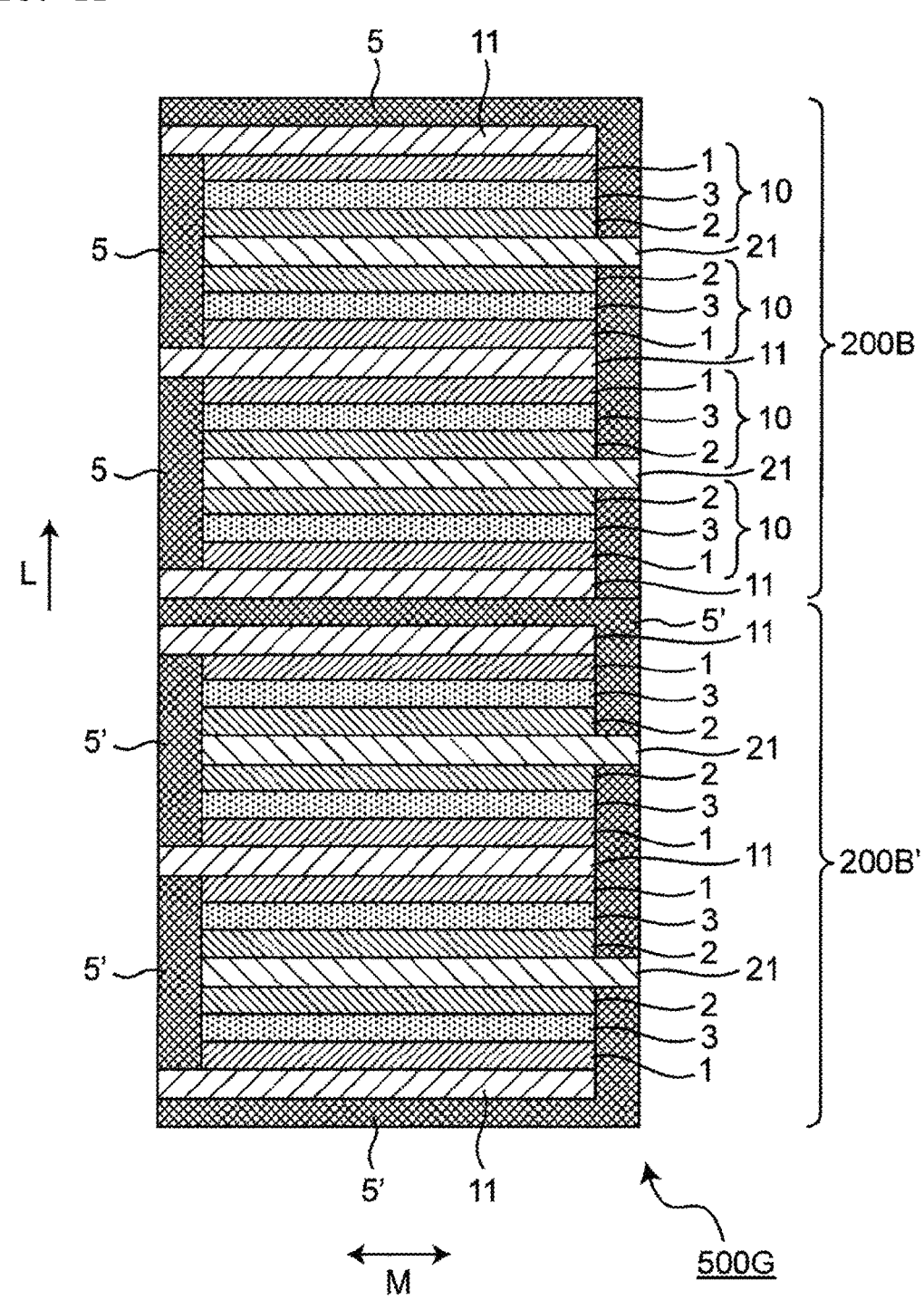
FIG. 11 illustrates a schematic sectional view of a solid-state battery group according to a seventh embodiment of the present invention.
Figure 12:
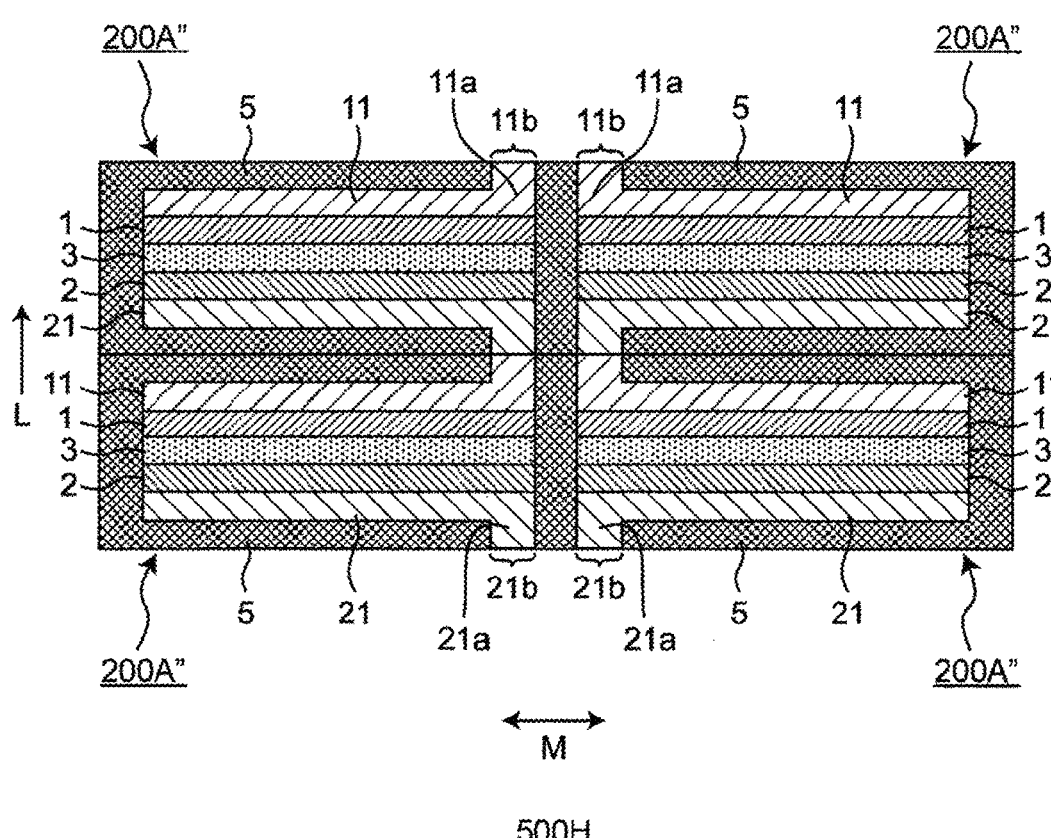
FIG. 12 illustrates a schematic sectional view of a solid-state battery group according to an eighth embodiment of the present invention.

In the solid-state battery group according to the present invention, in FIGS. 5 to 8, two layers of protective layers (that is, a protective layer of one solid-state battery and a protective layer of the other solid-state battery) are interposed between two adjacent solid-state batteries, but it is also possible to unify the two protective layers and share one protective layer by the two solid-state batteries. For example, as illustrated in FIGS. 9 to 11, only one protective layer may be interposed between two adjacent solid-state batteries. In the solid-state battery group according to the present invention, as illustrated in FIG. 12, while two layers of protective layers are interposed between two adjacent solid-state batteries, only one protective layer may also be interposed between two other adjacent solid-state batteries. In the solid-state battery group according to the present invention, as illustrated in FIGS. 9 to 11, energy density of the solid-state battery group can be further improved by unifying the two protective layers between the two adjacent solid-state batteries. Moreover, as described above, not only separation between the solid-state batteries is suppressed between the two adjacent solid-state batteries, but also transmission due to dispersion of stress caused by volume expansion of the positive electrode layer and the negative electrode layer is suppressed, and thus deterioration of battery performance can be further suppressed. When two protective layers are interposed between the two adjacent solid-state batteries in the solid-state battery group according to the present invention, the form of the interposed protective layers is referred to as "two-layer form". On the other hand, when only one protective layer is interposed between the two adjacent solid-state batteries in the solid-state battery group according to the present invention, the form of the interposed protective layer is referred to as "single form".

For example, although a solid-state battery group 500E of FIG. 9 includes only two solid-state batteries according to the present invention, and the upper and lower solid-state batteries both correspond to the solid-state battery 200A of FIG. 1A, the protective layers are unified between two adjacent solid-state batteries. FIG. 9 illustrates a schematic sectional view of a solid-state battery group according to a fifth embodiment of the present invention.

Further, for example, a solid-state battery group 500F of FIG. 10 includes only three solid-state batteries according to the present invention, upper and lower solid-state batteries correspond to a solid-state battery 200A of FIG. 1A, and a middle solid-state battery corresponds to a solid-state battery 200A' having protective layers 5' that have different constituent materials from those of the protective layer 5 of the upper and lower solid-state batteries 200A. Such a solid-state battery group 500F is similar to the solid-state battery group 500D of FIG. 8 except that the protective layer between two adjacent solid-state batteries is unified. FIG. 10 illustrates a schematic sectional view of a solid-state battery group according to a sixth embodiment of the present invention.

Further, for example, a solid-state battery group 500G of FIG. 11 includes only two solid-state batteries according to the present invention, an upper solid-state battery corresponds to a solid-state battery 200B of FIG. 2, and a lower solid-state battery corresponds to a solid-state battery 200B' having protective layers 5' that have different constituent materials from those of the protective layer 5 of the upper solid-state battery 200B. Such a solid-state battery group 500G is similar to the solid-state battery group 500B of FIG. 6 except that the protective layer between two adjacent solid-state batteries is unified. FIG. 11 illustrates a schematic sectional view of a solid-state battery group according to a seventh embodiment of the present invention.

Further, for example, the solid-state battery group 500H of FIG. 12 includes only four solid-state batteries according to the present invention. All of the four solid-state batteries are solid-state batteries 200A" similar to the solid-state battery 200A of FIG. 1A. The solid-state battery 200A" is a solid-state battery similar to the solid-state battery 200A of FIG. 1A except that the exposed portion 11b of the electrical connection portion 11a is provided on an upper surface of the solid-state battery and the exposed portion 21b of the electrical connection portion 21a is provided on a lower surface of the solid-state battery. In FIG. 12, two solid-state batteries adjacent to each other in the stacking direction L are connected based on a series structure. FIG. 12 illustrates a schematic sectional view of a solid-state battery group according to an eighth embodiment of the present invention.

[Method for Manufacturing Solid-State Battery]

The solid-state battery according to the present invention can be produced by a printing method such as a screen printing method, a green sheet method using a green sheet, or a composite method thereof. Hereinafter, the case where the printing method is employed will be described in detail, but it is clear that the method is not limited to this method.

A method for manufacturing a solid-state battery according to the present invention includes a step of forming an unfired stack by a printing method, and a step of firing the unfired stack.

(Step of Forming Unfired Stack)

In this step, using several types of pastes such as a positive electrode layer paste, a negative electrode layer paste, a positive electrode current collecting layer paste, a negative electrode current collecting layer paste, a solid electrolyte layer paste, and a protective layer paste, and the like as ink, an unfired stack having a predetermined structure is formed on a substrate by a printing method.

The paste can be produced by wet-mixing a predetermined constituent material of each layer selected from the group consisting of a positive electrode active material, a negative electrode active material, an electron conductive material, a solid electrolyte material, an insulating substance, and a sintering additive with an organic vehicle obtained by dissolving an organic material in a solvent.

For example, the positive electrode layer paste contains a positive electrode active material, an electron conductive material, a solid electrolyte material, an organic material, and a solvent.

Further, for example, the negative electrode layer paste contains a negative electrode active material, an electron conductive material, a solid electrolyte material, an organic material, and a solvent.

Further, for example, the positive electrode current collecting layer paste and the negative electrode current collecting layer paste contain an electron conductive material, a sintering additive, an organic material, and a solvent.

Further, for example, the solid electrolyte layer paste contains a solid electrolyte material, a sintering additive, an organic material, and a solvent.

Further, for example, the protective layer paste contains an insulating substance, an organic material, and a solvent.

The organic materials contained in the pastes are not particularly limited, but polymer compounds such as polyvinyl acetal resin, cellulose resin, polyacrylic resin, polyurethane resin, polyvinyl acetate resin, and polyvinyl alcohol resin can be used.

The solvent is not particularly limited as long as the organic material can be dissolved, and for example, toluene, ethanol, and the like can be used.

In the wet mixing, a medium can be used, and specifically, a ball mill method, a viscomill method, or the like can be used. On the other hand, a wet mixing method that does not use media may be used, and a sand mill method, a high-pressure homogenizer method, a kneader dispersion method, or the like can be used.

The substrate is not particularly limited as long as it can support the unfired stack, and for example, a polymer material such as polyethylene terephthalate can be used. Note that when the unfired stack is subjected to a firing step while being held on the substrate, the substrate used is one having heat resistance to firing temperature.

Figure 13:
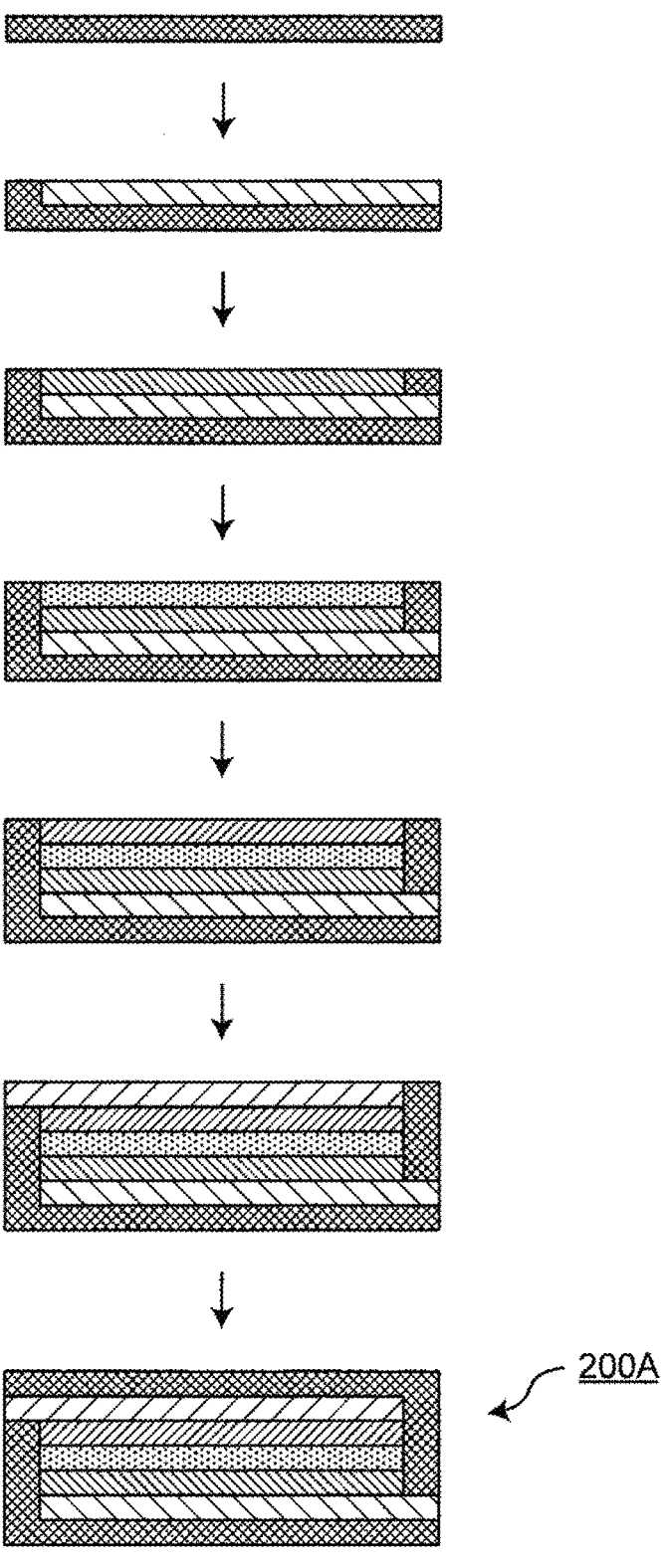
FIG. 13 is a flow chart for explaining an example of a step of forming an unfired stack in a method for manufacturing a solid-state battery according to the present invention.

At the time of printing, print layers are sequentially stacked with predetermined thicknesses and pattern shapes, and an unfired stack corresponding to a predetermined solid-state battery structure is formed on the substrate. Specifically, when the solid-state battery 200A of FIG. 1A is manufactured, a plurality of printing layers is sequentially stacked with thicknesses and pattern shapes as illustrated in FIG. 13, for example. In forming each print layer, a drying treatment (that is, a solvent evaporation treatment) is performed. FIG. 13 is a flow chart of a step of forming an unfired stack for explaining an example of the method for manufacturing a solid-state battery according to the present invention. The substrate is omitted in FIG. 13.

After forming the unfired stack, the unfired stack may be peeled off from the substrate and subjected to a firing step, or the unfired stack may be subjected to a firing step while being held on the substrate.

(Firing Step)

The unfired stack is subjected to firing. The firing is carried out by removing the organic material in a nitrogen gas atmosphere containing oxygen gas, for example, at 500° C., and then heating in a nitrogen gas atmosphere, for example, at 550° C. or higher and 1000° C. or lower. The firing is usually performed while pressurizing the unfired stack in the stacking direction L (in some cases, the stacking direction L and the direction M perpendicular to the stacking direction L). The pressing force is not particularly limited, and may be, for example, 1 kg/cm$^2$ or more and 1000 kg/cm$^2$ or less, particularly 5 kg/cm$^2$ or more and 500 kg/cm$^2$ or less.

[Method for Manufacturing Solid-State Battery Group]

The solid-state battery group according to the present invention can be manufactured by a method similar to the above-described method for manufacturing the solid-state battery according to the present invention, except that an unfired stack corresponding to a structure of a predetermined solid-state battery group is formed in the step of forming the unfired stack.

Alternatively, the solid-state battery group according to the present invention can be produced by forming the unfired stack corresponding to the structure of the predetermined solid-state battery group by dividing into two or more and using them in combination. For example, in a case of manufacturing the solid-state battery group 500A of FIG. 5, in the above-described step of forming the unfired stack, two unfired stacks of an unfired stack corresponding to a structure of the solid-state battery 200A and an unfired stack corresponding to a structure of the solid-state battery 200A' are individually formed. The two unfired stacks are then used in combination before being subjected to the firing step. Specifically, the two unfired stacks are stacked or arranged and then assembled so as to correspond to the structure of the predetermined solid-state battery group. An obtained stack aggregate is subjected to the above-described firing step.

In this manner, by forming the unfired stack corresponding to the structure of the predetermined solid-state battery group by dividing into two or more and using them in combination, not only the specifications (for example, battery capacity) of the solid-state battery group demanded by the user can be met easily, but also the solid-state battery group can be easily manufactured (or processed).

A solid-state battery according to one embodiment of the present invention can be used in various fields where power storage is expected. The solid-state battery according to one embodiment of the present invention can be used, although merely examples, for electric, information, communication fields where mobile devices are used (for example, fields of mobile devices such as mobile phones, smartphones, smart watches, laptop computers and digital cameras, activity meters, arm computers, electronic paper, and the like), home and small industrial applications (for example, fields of power tools, golf carts, and domestic, nursing, and industrial robots), large industrial applications (for example, fields of forklifts, elevators, gantry cranes), transportation system fields (for example, fields of hybrid cars, electric cars, buses, trains, power assisted bicycles, electric motorcycle, and the like), power system applications (for example, fields of various power generations, road conditioners, smart grids, general household power storage systems, and the like), medical applications (medical equipment fields such as earphone hearing aids), pharmaceutical applications (fields such as dose management systems), and IoT fields, space and deep sea applications (for example, fields of space probe, submersible research vehicle, and the like), and the like.

DESCRIPTION OF REFERENCE SYMBOLS

1: Positive electrode layer
1a: Electrical connection portion of positive electrode layer
1b: Exposed portion of positive electrode layer
2: Negative electrode layer
2a: Electrical connection portion of negative electrode layer
2b: Exposed portion of negative electrode layer
3: Solid electrolyte layer 5: Protective layer
10: Battery constitutional unit
11: Positive electrode current collecting layer
11a: Electrical connection portion of positive electrode current collecting layer
11b: Exposed portion of positive electrode current collecting layer
21: Negative electrode current collecting layer
21a: Electrical connection portion of negative electrode current collecting layer
21b: Exposed portion of negative electrode current collecting layer
100: Battery element 200 (200A, 200B, 200C, 200D, 200A', 200B', 200A"): Solid-state battery
500 (500A, 500B, 500C, 500D, 500E, 500F, 500G, 500H): Solid-state battery group

The invention claimed is:

1. A solid-state battery comprising:
a battery element that includes one or more battery constitutional units, each battery constitutional unit including a positive electrode layer and a negative electrode layer facing each other and a solid electrolyte layer arranged between the positive electrode layer and the negative electrode layer;
a protective layer covering an upper surface of an uppermost layer of the battery element, a lower surface of a lowermost layer of the battery element, and a side surface of the battery element, the protective layer including an insulating substance other than a resin;
a positive electrode current collecting layer on a side of the positive electrode layer opposite to the solid electrolyte layer; and
a negative electrode current collecting layer on a side of the negative electrode layer opposite to the solid electrolyte layer,
wherein the protective layer covers at least one of the positive electrode current collecting layer and the negative electrode current collecting layer,
wherein the positive electrode layer and the negative electrode layer each have an exposed portion that is not covered by the protective layer on the side surfaces of the battery element; and
the positive electrode layer, the negative electrode layer, and the solid electrolyte layer constituting the battery element are not exposed to an outside of the protective layer except the exposed portions of the positive electrode layer and the negative electrode layer, and
wherein the protective layer is in direct contact with the non-exposed ends of each of the positive electrode layer, the negative electrode layer, and the solid electrolyte layer without an interposition of another layer therebetween.

2. The solid-state battery according to claim 1, wherein the protective layer is an integrally sintered body with the upper surface of the uppermost layer of the battery element, the lower surface of the lowermost layer of the battery element, and the side surface of the battery element.

3. The solid-state battery according to claim 1, wherein the protective layer is in direct contact with the upper surface of the uppermost layer of the battery element, the lower surface of the lowermost layer of the battery element, and the side surface of the battery element.

4. The solid-state battery according to claim 1, wherein the positive electrode current collecting layer and the negative electrode current collecting layer constituting the battery element are not exposed to an outside of the protective layer except at the exposed portions of the positive electrode current collecting layer and the negative electrode current collecting layer.

5. The solid-state battery according to claim 1, wherein the protective layer covers an entire outer surface of the battery element except the exposed portions of the positive electrode current collecting layer and the negative electrode current collecting layer.

6. The solid-state battery according to claim 1, wherein the protective layer covers at least one of the positive electrode layer and the negative electrode layer.

7. The solid-state battery according to claim 6, wherein the protective layer covers an entire outer surface of the battery element except the exposed portions of the positive electrode layer and the negative electrode layer.

8. The solid-state battery according to claim 1, wherein all layers of the battery element are integrally sintered layers.

9. The solid-state battery according to claim 1, wherein the insulating substance is an insulating inorganic substance.

10. The solid-state battery according to claim 9, wherein the insulating inorganic substance is one or more materials selected from the group consisting of glass and ceramics.

11. The solid-state battery according to claim 1, wherein the insulating substance has an ionic conductivity of $1\times10^{-7}$ S/cm or less.

22

12. The solid-state battery according to claim 1, wherein the insulating substance has an electron conductivity of $1\times10^{-7}$ S/cm or less.

13. The solid-state battery according to claim 1, wherein a thickness of a thickest portion of the protective layer is 500 μm or less.

14. A solid-state battery group comprising:

two or more solid-state batteries according to claim 1, wherein two adjacent solid-state batteries among the two or more solid-state batteries are integrally sintered bodies with the protective layer interposed therebetween.

15. The solid-state battery group according to claim 14, wherein the protective layer interposed between the two adjacent solid-state batteries is a single-layer.

16. The solid-state battery group according to claim 14, wherein the protective layer interposed between the two adjacent solid-state batteries is two-layers.

17. The solid-state battery according to claim 1, wherein the protective layer covers an entire surface of the solid-state battery except for the exposed portions of the positive electrode layer and the negative electrode layer.

* * * * *